(12) United States Patent
Dais et al.

(10) Patent No.: US 6,624,741 B1
(45) Date of Patent: Sep. 23, 2003

(54) VEHICLE LOCKING SYSTEM

(75) Inventors: Michael Dais, Filderstadt (DE); Michael Geber, Bad Urach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/385,367

(22) Filed: Aug. 30, 1999

(30) Foreign Application Priority Data

Aug. 28, 1998 (DE) .......................................... 198 39 350

(51) Int. Cl.⁷ .......................... B60R 25/00; G05B 19/00; G06F 7/00; G08B 29/00; H04B 1/00
(52) U.S. Cl. ...................................... 340/5.72; 340/5.64
(58) Field of Search ................................ 340/5.72, 5.7, 340/5.71, 5.8, 5.61, 5.62, 5.64, 825.36, 5.6, 5.3

(56) References Cited

U.S. PATENT DOCUMENTS

| | | | | |
|---|---|---|---|---|
| 4,670,746 A | * | 6/1987 | Taniguchi et al. | 340/825.31 |
| 4,672,375 A | * | 6/1987 | Mochida et al. | 340/825.31 |
| 4,811,013 A | * | 3/1989 | Akutsu | 340/825.31 |
| 5,499,022 A | | 3/1996 | Boschini | 340/825.69 |
| 5,600,302 A | * | 2/1997 | Lewis | 340/457 |
| 5,859,479 A | * | 1/1999 | David | 307/10.8 |
| 5,929,769 A | * | 7/1999 | Garnault | 340/825.31 |
| 5,969,597 A | * | 10/1999 | Weigl et al. | 340/426 |
| 5,973,611 A | * | 10/1999 | Kulha et al. | 340/825.31 |
| 6,087,987 A | * | 7/2000 | Bachhuber et al. | 342/457 |
| 6,222,442 B1 | * | 4/2001 | Gager et al. | 340/426 |

FOREIGN PATENT DOCUMENTS

| | | |
|---|---|---|
| DE | 41 23 654 A1 | 7/1991 |
| DE | 4123654 | 1/1993 |
| DE | 44 09 167 C1 | 3/1994 |
| DE | 195 31 219 C1 | 8/1995 |
| DE | 195 42 441 C2 | 11/1995 |
| DE | 19735658 | 10/1999 |
| EP | 0426114 | 8/1991 |
| FR | 2 697 864 | 5/1994 |
| JP | 60-164574 | 8/1985 |
| JP | 63-73464 | 5/1988 |
| JP | 1-94561 | 6/1989 |
| JP | 6-207484 | 7/1994 |

OTHER PUBLICATIONS

Office Action from Japanese Patent Office (Apr. 10, 2001).
B. Preimer, Kleines Wunder—Vorstellung Mercedes S–Klasse [Minor miracle—Introduction to the Mercedes S–Class], Auto Motor Sport, 15/1998, p. 16.
Copy of the Search Report.

* cited by examiner

*Primary Examiner*—Michael Horabik
*Assistant Examiner*—Nam V Nguyen
(74) *Attorney, Agent, or Firm*—Crowell & Moring LLP

(57) ABSTRACT

A vehicle locking system has a locking unit for a movable vehicle part (particularly a trunk lid) which can be moved between an opened and a locked position and which, in the opened position, provides access to an adjoining vehicle interior area and blocks such access in the locked position. When an authentication element is used which can be carried along on the user side, the locking unit, is reversible between an unlocked state, in which it releases the opening of the movable vehicle part, and a locked state in which it prevents the opening of the movable vehicle part. Authentication element detection devices determine whether an authentication element is situated in the vehicle interior area, and, if so, control the locking unit into its unlocked condition and/or generate a corresponding indicating signal.

10 Claims, 1 Drawing Sheet

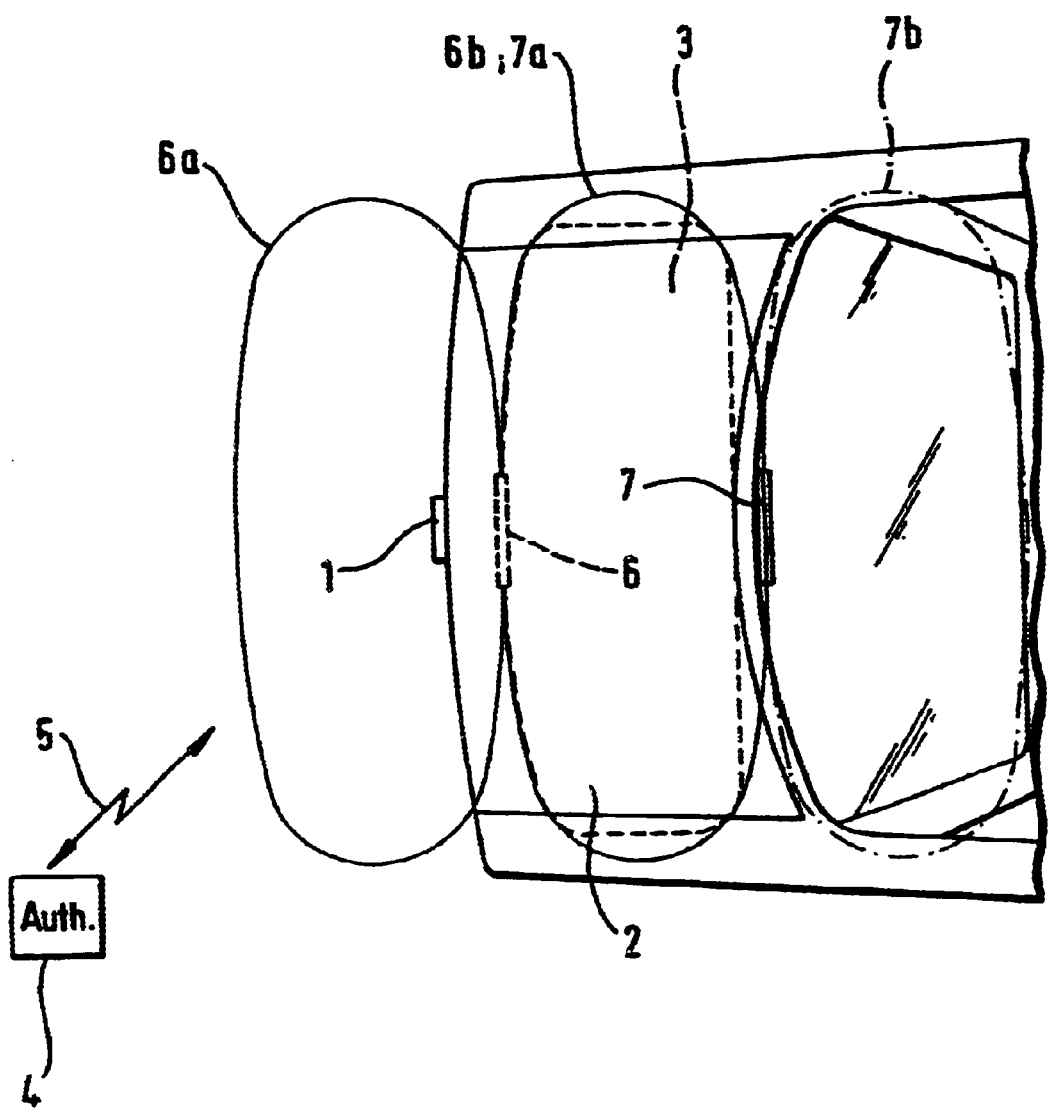

VEHICLE LOCKING SYSTEM

BACKGROUND AND SUMMARY OF THE INVENTION

This application claims the priority of German patent 198 39 350.4, filed Aug. 28, 1998, the disclosure of which is expressly incorporated by reference herein.

The invention relates to a vehicle locking system of the type having a locking unit which can be actuated by an authentication element carried by a vehicle operator, and which is reversible between a locked and an unlocked position.

Vehicle locking systems having a locking unit which can be actuated reversibly between an unlocked and a locked state by means of an authentication element are commonly used, for example, in automobiles. In such systems, a movable vehicle part which can be opened and closed to provide or deny access to an adjoining vehicle interior, may be in particular a trunk lid by which access can be gained to a trunk of the vehicle. As known, the trunk lid is provided with a locking unit of the vehicle locking system, which can be reversed between an unlocked and a locked state by a portable authentication element that can be carried by the user. Thus, access to the vehicle, particularly the trunk, is permitted only to authorized vehicle users have an authentication element which identifies them as being authorized.

According to the design of the vehicle locking system, mechanical or electronic keys are conventionally used as authentication elements; see, for example, German Patent Document DE 195 31 219 C1. Recently, chip cards, transponders and the like have increasingly been used which are part of a so-called "Keyless Go System"; see, for example, German Patent Document DE 44 09 167 C1. The Keyless Go Systems and the systems with electronic keys have the advantage that they require no action by the vehicle user to identify himself as being authorized to gain access to and/or drive the vehicle; that is, to be able to effectively control the locking system and/or an electronic drive-away blocking system.

In contrast to systems with electronic keys, the Keyless Go Systems have the additional advantage that, for proving the access and/or driving authorization, they require only that the vehicle user carry with him an authentication element which is valid for the vehicle, without having to perform any manipulation of the authentication element. In addition to being used for the locking unit which is of interest here (such as the trunk lid), such locking systems include additional locking units, such as vehicle doors, etc. On the other hand, the vehicle part which is considered here and which opens or blocks access to an adjoining vehicle interior, may be a vehicle door itself. Other vehicle parts having such a function can also be used, such as the engine hood, a sliding roof, a removable roof, etc.

The problem that the vehicle user leaves his authentication element in the lockable vehicle interior and then locks the vehicle can occur in all above-mentioned cases. The authentication element may, for example, remain in the locked trunk, and the vehicle user closes the trunk lid from the outside. This problem is particularly serious if the vehicle part can be switched into its locked state while it is in the open position, and the locked condition maintained when the vehicle part is closed (which typically occurs in the case of the trunk lid). In this case, the other access possibilities to the vehicle, such as the door, will then also be locked. Because the trunk is not accessible from the remaining vehicle interior in many cases, the authorized vehicle user must then first procure another valid authentication element in order to again have access to the authentication element left in the car if he does not want to break open the locking unit.

In Keyless Go Systems, it is known to provide antennas at selected points on the vehicle, whose range, (also called capture range) defines the action range of an associated wireless authentication communication channel, via which access and/or driving authorization testing communication operations take place for a vehicle locking system or an electronic drive-away blocking system. Such a communication operation will successfully take place only if an authentication element valid for the vehicle is situated in the action range of the communication channel. A special antenna arrangement of this type is described in German Patent Document DE 195 42 441 C2. It is known from the above, among other things, that at least a pair of individual antennas can be arranged under a rear window shelf, in the trunk or in its proximity in order to emit signals to an authentication element in the trunk or in its direct proximity; that is, the capture range will then be limited to the space in or around the trunk.

A locking system of the above-mentioned type is described in German Published Patent Application DE 41 23 654 A1. In this locking system, the emission of a locking command, triggers a question-and-answer dialogue between a vehicle antenna unit and a portable transponder, which is used as the authentication element, and it is determined whether the transponder is situated in the receiving range of the one or several antennas inside the concerned vehicle interior or outside the vehicle. The requested, locking will not be carried out until it is recognized that the transponder is situated outside the vehicle (not inside it). This document also indicates that a locking system is known in which a corresponding question-and-answer dialogue for the transponder detection is not triggered immediately with the transmission of a locking command but is delayed by a defined waiting period and, in the case of a detection, a warning signal is generated.

One object of the invention is to provide a vehicle locking system of the type described above, which offers protection against an accidental locking-in of an authentication element in a lockable vehicle interior area.

This and other objects and advantages are achieved by the vehicle locking system according to the invention, which includes authentication element detection devices that, on the one hand, determine whether an authentication element (particularly an element for authorizing access to and/or the driving of the concerned vehicle) is situated in the vehicle interior area which can be closed off by the movable vehicle part, and, on the other hand, initiate special advantageous actions for such a case.

Thus, in one embodiment of the invention, in the event of a detection, the authentication element detection devices cause not only an unlocking of the locking unit of the respective vehicle part, but also an automatic opening of the vehicle part. This represents an indicating signal, which can immediately be recognized by the vehicle user, and indicates that an authentication element is still situated in the concerned vehicle interior area. The vehicle user can then immediately pick up his authentication element which had been left in the vehicle interior area.

Another embodiment of the invention contains the special measure that the authentication element detection devices monitor the vehicle interior area for the presence of an authentication element, independently of the existence of a locking command, also in the unlocked condition of the locking system. In the event of a detection, such devices generate a corresponding indicating signal, which may be, for example, an acoustic or a visual signal. In this manner, the driver can be warned in time before closing the vehicle component, not to lock in his authentication element.

These measures according to the invention that, thus prevent the occurrence of a situation in which the vehicle user leaves the authentication element behind, and after closing the concerned vehicle part, leaves the vehicle in the incorrect belief (in the case of an otherwise locked locking system condition), that the vehicle is completely locked.

The authentication element detection devices can be implemented in any conventional manner, particularly by using a wireless detection communication channel, via which a vehicle-mounted communication component equipped, for example, with appropriately designed and arranged antennas can communicate with a corresponding communication component of the authentication element if the latter is in the action range (that is, in the capture range) of this communication channel.

Still another embodiment of the locking system according to the invention has the special advantage that the monitoring function of the authentication element detection devices concerning whether an authentication element is present in the vehicle interior area can be temporarily deactivated by the user. This feature permits the intentional deposit and locking-in of an authentication element there if desired, without triggering any actions, such as generating an indicating signal or unlocking of a locking unit. As a result, the driver can deposit a first authentication element in this vehicle interior area (for example, the trunk) and continue to normally trigger the vehicle locking system by means of a second authentication element.

In yet another embodiment of the invention, the authentication element detection devices contain a wireless detection communication channel which is advantageously designed with an action range that just covers the vehicle interior, and which can be closed off by the movable vehicle part so that corresponding detection communication operations between a vehicle-borne communication component and the authentication element will take place successfully only if the authentication element is situated in the lockable vehicle interior area. This in turn permits a clear detection of such an authentication element in this area.

According to another feature of the invention, the wireless detection communication channel on the authentication element uses communication components which are otherwise present for authentication communication to check access authorization, as provided for the triggering of the locking unit. This further development of the invention can therefore be used beneficially for Keyless Go Systems and systems with electronic keys because the existing wireless authentication communication channel can be utilized as well to detect the presence of an authentication element in the trunk or another lockable vehicle interior area.

Other objects, advantages and novel features of the present invention will become apparent from the following detailed description of the invention when considered in conjunction with the accompanying drawings.

BRIEF DESCRIPTION OF THE DRAWINGS

The single FIGURE is a schematic top view of the trunk area of an automobile with a schematically illustrated action range of an authentication element detection communication channel.

DETAILED DESCRIPTION OF THE DRAWINGS

The automobile, of which only the rearward area is shown in the figure, is equipped with a vehicle locking system in the form a conventional Keyless Go System. (Alternatively, it may be of any other conventional type.) In addition to locking units which are of no interest here (for example, for vehicle doors, etc.), this locking system has a conventional locking unit 1 for a rear lid 2. In the unlocked state of the locking unit 1, the rear lid 2 can be opened and closed by the vehicle user from the outside, thereby providing access to a trunk 3 which is depicted schematically by a broken line.

On the user side, the vehicle locking system comprises one or several authentication elements 4 which are valid for the particular vehicle (only one being shown in the figure). The vehicle user uses the authentication elements 4 to prove his access authorization and optionally also his authorization to drive the vehicle; that is, he can use them to trigger the vehicle locking system and, if it exists, an electronic drive-away blocking system. In the case of the implementation as the Keyless Go System, it is sufficient for the vehicle user to carry the authentication element 4 with him. Whenever it is situated in the action range of this communication channel, it will then effectively communicate with the vehicle locking system and the electronic drive-away blocking system by way of a corresponding authentication communication channel 5. As initially mentioned, the action range can be defined in a desirable manner, for example, by a suitable antenna arrangement. In the case of an access authorization check, this action range expediently comprises a vehicle-exterior access zone which the vehicle user enters simply by approaching the vehicle, and, in the case of checking the authorization to drive the vehicle, an interior area in which the vehicle user is typically present during the driving operation or deposits the authentication element.

Thus, in the illustrated example, an antenna unit 6 is arranged in the rearward area of the trunk lid 2 (or alternatively on a bumper, which is not shown), such that it transmits with a typical double-lobe characteristic pattern, of which one lobe 6a covers a rearward vehicle-exterior access zone, while the other lobe 6b covers essentially the trunk area 3. When the authentication element 4 enters the range of the rearward exterior lobe 6a, an access authorization checking operation is triggered, either automatically or upon the user's demand (for example, by way of an unlocking operating element arranged on the rear lid). If this access authorization checking operation is successful, the rear lid locking unit 1 is moved into its unlocked condition. The vehicle user, who was thus found to be authorized to gain access, can then open the rear lid by way of an operating element arranged on the rear lid and have access to the trunk 3. According to the system design, together with the rear lid locking unit 1, the door locking units are also unlocked, or they remain locked.

By operating a locking operating element, the vehicle user can then change the rear lid locking unit and the other locking units to their locked condition, as long as his authentication element 4 continues to be situated in the action range of the communication channel checking the access authorization. If he then shuts the rear lid 2, in the case of conventional systems, it would remain in its locked condition so that therefore an authentication element left accidentally in the trunk would be locked in there.

In order to prevent this, or at least to warn the vehicle user, the vehicle locking system according to the invention includes authentication element detection devices which can determine whether an authentication element is situated in the lockable vehicle interior area (for example, the trunk 3). Thus, in the FIGURE, another antenna 7, is arranged for this purpose in the rear window shelf area, and also transmits with a typical double-lobe characteristic, as illustrated in part by a dash-dot line. One beaming lobe 7a overlaps a lobe of the antenna 6, and covers the trunk area 3, while another beaming lobe 7b covers a vehicle rear compartment area, which is of no further interest here. Furthermore, the authentication detection devices comprise a vehicle-borne access control component (not shown) which forms the control unit of the vehicle locking system. On the one hand, this access control component fulfills the normal functions of such a locking system control unit. (That is, it receives the user commands for triggering the desired access control measures, triggers the required authentication operation and checks it for a successful operation and, as a function thereof, causes or does not cause the desired locking system control measure). On the other hand, as part of the authentication element localizing devices, it carries out the function of determining from the communication signals of the two above-mentioned antennas 6, 7 whether an authentication element valid for the vehicle is situated in the trunk 3. For this purpose, it triggers in each case an authentication communication operation by each of the two antennas 6 or 7 and then queries whether the communication operation is successfully taking place by each of the two antennas 6, 7. This will be so when a valid authentication element is situated in the trunk 3 since this area 3 corresponds to the common capture range of the two antennas 6, 7.

Alternatively, the antenna arrangement of the authentication element detection devices may be designed with a capturing range (and thus an effective range) which covers only the trunk 3, completely. In this case, the antenna signal analysis component of these authentication element detection devices (which, in turn, can be situated in the locking system control unit) needs only determine whether an authentication operation triggered by way of this antenna arrangement is successfully taking place, since this is then a clear indication that a valid authentication element is situated in the trunk 3.

It is of course to be understood that the authentication element detection devices can also be implemented differently. Thus, for example, a detection communication channel can be provided which is independent of one or several authentication communication channels and by way of which a transmitter or transceiver installed in the authentication element (such as a mechanical or electronic key), continuously or upon a received demand signal, emits a locating signal. The latter can be received by a receiver arranged on the trunk whose receiving range corresponds essentially to the trunk area 3.

Regardless of the type of detection component which is used as the authentication element detection devices, they are furthermore designed such that, when an authentication element is detected in the trunk, they emit a corresponding indicating signal as a warning to the vehicle user and/or control the rear lid locking unit 1 into its unlocked condition. As a result, the vehicle user can be prevented from locking himself out when the locking system as a whole is in the locked condition but the rear lid 2 is still open, if he accidentally deposits the authentication element in the trunk 3 and then shuts the trunk lid 2. The reason is that, in the implementation in which the authentication detection devices then unlock the rear lid locking unit again, the vehicle user can remove his authentication element from he trunk 3.

Preferably, the authentication element detection devices not only change the trunk lid locking unit into its unlocked state, but also automatically open the rear lid 2, thereby immediately signalling to the vehicle user that he must have left his authentication element in the trunk. Thus, he can remove it immediately, without having to open the rear lid 2 again himself. The indicating signal also prevents the vehicle user from leaving the vehicle erroneously believing that the vehicle is completely locked.

In addition (or alternatively) to such an immediate indicating signal, an indicating signal can be provided in the form of a visual and/or acoustic warning signal. Advantageously, such a signal is triggered by the authentication detection devices already when they detect the presence of an authentication element in the trunk 3, so that the vehicle user does not shut the rear lid 2. Furthermore, such a visual or acoustic warning signal is also useful when the vehicle locking system is in the unlocked condition, to inform the vehicle user of this fact. The indication can take place, for example, on an instrument panel of the vehicle which is visible to the vehicle driver.

In a preferred implementation, the authentication element detection devices can be temporarily deactivated upon the user's demand, for example, by means of a corresponding switch or the like. Thus, as required, an authentication element can then intentionally be deposited in the trunk and can be locked in, if desired, without triggering a corresponding indicating signal and/or the unlocking of the rear lid locking unit.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle locking system, comprising:
   a locking unit for a movable vehicle part that can be moved between an opened and a closed position and which, in the opened position, provides access to an adjoining vehicle interior area, and blocks such access in the closed position;
   a user transportable authentication element, said locking unit being reversible between an unlocked state, in which it releases the opening of the movable vehicle part, and a locked state in which it blocks the opening of the movable vehicle part, when the authentication element is carried alone on the user side; and
   authentication element detection devices which determine whether an authentication element is situated in the vehicle interior area to which access is controlled by the movable vehicle part;
   wherein the authentication element detection devices control the locking unit for the movable vehicle part into its unlocked position and trigger an automatic opening of the movable vehicle part when they detect an authentication element in the vehicle interior area adjoining the movable vehicle part; and
   wherein a query function of the authentication element detection devices as to whether an authentication element is situated in the vehicle interior area adjoining the movable vehicle part can be temporarily deactivated by the vehicle user.

2. A vehicle locking system according to claim 1, wherein said movable vehicle part is a trunk lid.

3. Vehicle locking system according to claim 1, wherein the authentication element detection devices comprise a wireless detection communication channel whose action range corresponds to the vehicle interior area adjoining the movable vehicle part, so that detection communication operations taking place via the channel between the authentication element detection devices and an authentication element take place successfully only when the authentication element is situated in this vehicle interior area.

4. Vehicle locking system according to claim 3, wherein the wireless detection communication channel on the authentication element utilizes the same communication components as an access authorization communication channel which is provided for authentication operations for the user-demanded controlling of the locking unit.

5. Vehicle locking system according to claim 1 wherein the authentication element detection devices comprise a wireless detection communication channel whose action range corresponds to the vehicle interior area adjoining the movable vehicle part, so that detection communication operations taking place via the channel between the authentication element detection devices and an authentication element take place successfully only when the authentication element is situated in this vehicle interior area.

6. Vehicle locking system according to claim 5, wherein the wireless detection communication channel on the authentication element utilizes the same communication components as an access authorization communication channel which is provided for authentication operations for the user-demanded controlling of the locking unit.

7. Vehicle locking system, comprising:

a locking unit for a movable vehicle part that can be moved between an opened and a closed position and which, in the opened position, provides access to an adjoining vehicle interior area and blocks such access in the closed position;

a user transportable authentication element, said locking unit being reversible between an unlocked state, in which it releases the opening of the movable vehicle part, and a locked state, in which it blocks the opening of the movable vehicle part, when the authentication element is carried along on the user side; and authentication element detection devices which determine whether an authentication element is situated in the vehicle interior area to which access is controlled by the movable vehicle part;

wherein the authentication element detection devices determine in the unlocked state of the vehicle locking system whether an authentication element is situated in the vehicle interior area adjoining the movable vehicle part, and if so, generate a corresponding indicating signal; and wherein a query function of the authentication element detection devices as to whether an authentication element is situated in the vehicle interior area adjoining the movable vehicle part, can be temporarily deactivated by the vehicle user.

8. A vehicle locking system according to claim 7, wherein said movable vehicle part is a trunk lid.

9. Vehicle locking system according to claim 7, wherein the authentication element detection devices comprise a wireless detection communication channel whose action range corresponds to the vehicle interior area adjoining the movable vehicle part, so that detection communication operations taking place via the channel between the authentication element detection devices and an authentication element take place successfully only when the authentication element is situated in this vehicle interior area.

10. Vehicle locking system according to claim 9, wherein the wireless detection communication channel on the authentication element utilizes the same communication components as an access authorization communication channel which is provided for authentication operations for the user-demanded controlling of the locking unit.

* * * * *